N. WILKINSON.
CIRCUIT CONTROLLING APPARATUS.
APPLICATION FILED JUNE 27, 1910.
1,016,661.
Patented Feb. 6, 1912.
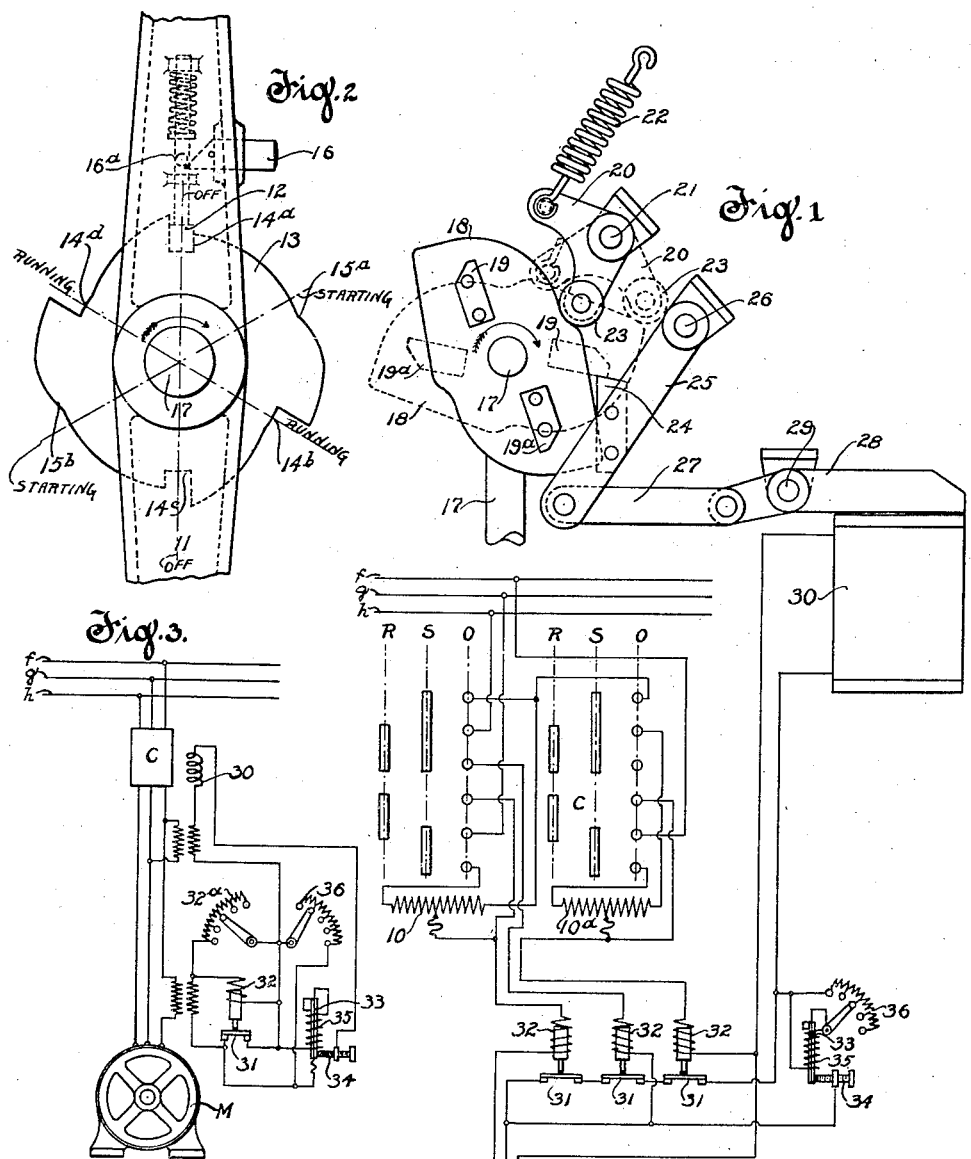

UNITED STATES PATENT OFFICE.

NATHAN WILKINSON, OF MILWAUKEE, WISCONSIN, ASSIGNOR TO ALLIS-CHALMERS COMPANY, A CORPORATION OF NEW JERSEY.

CIRCUIT-CONTROLLING APPARATUS.

1,016,661. Specification of Letters Patent. Patented Feb. 6, 1912.

Application filed June 27, 1910. Serial No. 569,017.

*To all whom it may concern:*

Be it known that I, NATHAN WILKINSON, a citizen of the United States, residing at Milwaukee, in the county of Milwaukee and State of Wisconsin, have invented certain new and useful Improvements in Circuit-Controlling Apparatus, of which the following is a full, clear, and exact specification.

My invention relates to protective devices for electric apparatus, and particularly to no-voltage and time limit overload protective devices in combination with potential starters for polyphase induction motors.

In the operation of electric translating devices of various sorts, it is often desirable that the circuit be interrupted in case either the voltage of the supply circuit fails or there is an overload on the translating device. Often, however, it is undesirable that the breaking of the circuit occur immediately upon an overload, as in some classes of apparatus, such, for instance, as electric motors, it is often necessary that a temporary overload be permitted. In order to take care of this, time limit devices of various sorts have been proposed; and have been combined with the overload and no-voltage circuit-controlling means.

My present invention relates to arrangements of this sort. There is a time limit device, which is operative only during the continuance of predetermined abnormal conditions, such as an overload on a translating device, and this time limit device, upon being operated for a certain time, causes the deënergization of a holding magnet, which is preferably so connected that it is also deënergized upon failure of voltage on the supply circuit; the deënergization of this holding magnet causes the opening of the circuit.

The time limit device, in the preferred form of my invention, is an electrically heated thermostat. The time interval provided by the time limit device may be either dependent on or independent of the current taken by the translating device during the continuance of the overload. This form of protective means is especially applicable in the control of electric motors, and consequently I have shown it, and in some of my claims will claim it, in combination with an electric motor and its control apparatus.

The various novel features of my invention will be apparent from the description and drawings, and will be particularly pointed out in the claims.

Figure 1 shows diagrammatically one embodiment of my improved protective means as used in connection with a potential starter for induction motors; Fig. 2 shows part of the operating mechanism of such controller; and Fig. 3 shows diagrammatically a slightly modified system of connections.

The details of the starting controller proper will not be fully described here, since in the main they form no part of the present invention and are unnecessary to an understanding thereof.

The three-phase induction motor M is supplied with current from the three phase mains $f$, $g$, and $h$, through a controller C. When the controller is in off position, the motor is entirely disconnected. When the controller is in starting position the auto-transformer windings 10 and $10^a$ are each connected between two of the mains, the main $h$ being connected to one terminal of each winding. One of the terminals of the motor M is connected to those two terminals of the windings 10 and $10^a$ which are connected in common to the main $h$, and the other two motor terminals are connected to intermediate points on said windings respectively. The windings 10 and $10^a$ thus constitute in effect a single V-connected auto-transformer, the main $h$ and the middle terminal of the motor being connected to the middle of the V. When the controller is in running position the auto-transformer windings 10 and $10^a$ are entirely disconnected, and the motor terminals are connected directly to the three mains respectively. In the controller shown there is but one starting position between off and running positions, but it is obvious that any desired number of such starting positions may be employed.

The normal operation of the controller C is always in the same direction, a movement through 180° constituting a complete operation. The controller drum is moved by the operating handle 11 through suitable connecting mechanism. The opposite halves of the controller drum are identical in structure, and each half coöperates in turn with each of two sets of contact fingers during successive operations of the controller, the sets of contact fingers being on opposite sides of the drum and arranged to co-act simultaneously with the two halves of the drum respectively.

It is desirable that the controller be prevented from moving backward either from off position or from running position. The handle 11 is therefore provided with a spring-pressed pawl 12 which coöperates with a fixed notched plate 13 provided with notches 14ª, 14ᵇ, 14ᶜ, and 14ᵈ. The notches 14ª and 14ᶜ prevent backward movement from the off positions, in one of which positions the handle 11 is shown in Fig. 2, and the notches 14ᵇ and 14ᵈ prevent backward movement from the running positions. The plate 13 may be also provided with sharp inclines 15ª and 15ᵇ to mark the starting positions of the controller by requiring increased pressure to move the controller forward beyond such positions. The notches 14ᵇ and 14ᵈ allow the controller to move forward freely from the running positions; but in order to guard against accidental forward movement of the controller from the off positions, the notches 14ª and 14ᵇ are so designed that in order to move the controller forward from such positions the pawl 12 must be lifted out of the notch 14ª or 14ᶜ which it occupies. This is accomplished by means of a push button 16 which coöperates with a pin 16ª on the rod of the pawl 12. The push button 16 can lift the pawl 12 to clear the low or forward sides of the notches 14ª and 14ᶜ, but not high enough to clear the high or rearward sides of any of the notches of the plate 13.

Fixed on the shaft 17 of the operating handle 11 is a cam wheel 18 whereon are two stops 19 and 19ª. A bell-crank lever 20, pivoted at 21, is biased in a clockwise direction by means of a spring 22, and carries a roller 23 which rides on the periphery of the cam wheel 18; whereby the spring 22 biases the controller backward to off position when it is in starting position or at any point in its movement between off position and a point just short of running position, and biases it forward to off position when it has been moved forward beyond such point. Thus the controller is biased forward to off position when it is in running position. The cam 18 and bell-crank lever 20 are shown in full lines as they would be with the controller in off position and in dotted lines as they would be with the controller in running position. When the controller is moved to running position, one or the other of the stops 19 and 19ª strikes a stop 24 mounted on an arm 25 pivoted at 26. A component of any force transmitted to the arm 25 from a clockwise pressure on the cam 18, such as is exerted when the controller is in running position by the spring 22 or by forward manual pressure on the handle 11, tends to move said arm in a counter-clockwise direction to disengage the stop 24 from the stop 19 or 19ª. The arm 25 is connected by a link 27 to a weighted lever 28 pivoted at 29. The weighted end of the lever 28 forms the armature of a no-voltage release magnet 30, connected, either directly or through a potential transformer, across two of the leads of the motor M, preferably on the motor side of the controller C. The short end of the lever 28 is normally nearly in line with the link 27, so that the no-voltage magnet 30, acting on the weighted end of the lever 28, need not be unduly large in order to prevent the spring 22 from moving the controller from running position to off position in spite of the engagement of the stop 19 or 19ª with the stop 24. Such forward movement of the controller, however, takes place immediately upon the deënergization of the no-voltage magnet 30, or upon the application of sufficient forward pressure on the handle 11 to overcome the attraction of the magnet 30 on its armature. The deënergization of the magnet 30 naturally takes place if the voltage on the mains of the supply circuit $f$, $g$, $h$, fails. Thus the circuit is broken if no-voltage conditions arise when the controller is in running position. In the circuit of the magnet 30 are the switches 31 of one or more overload relays, the coils 32 of which are responsive respectively to excessive currents in the several motor leads. The coils 32 may be connected directly either in the mains, in parallel, if desired, with shunts which may or may not be adjustable, or in the secondary circuits of current transformers; and, if desired, may be adjustable, as by rheostats such as 32ª (Fig. 3), to respond to different strengths of current in the motor leads. There may be an overload relay for each main as illustrated in Fig. 1, or for some lesser number of mains. It is often sufficient to provide but one overload relay, as shown in Fig. 3, the load on the several phases of an induction motor generally being fairly well balanced. If there is more than one switch 31, the several switches are connected in series. In shunt to the switch or switches 31 is a thermal time element device, such as a thermostat 33. This thermostat usually consists of two strips of metal with dissimilar temperature coefficients of expansion, so that upon being heated the thermostat bends away from the adjustable contact 34.

The thermostat may be provided with a heating coil 35 to assist in heating it, and this coil may be shunted, if desired, by a rheostat 36 to adjust the time required for a given degree of heating. Upon an overload in the motor, one (or more) of the coils 32 raises its switch 31, thus breaking the shunt around the thermostat 33 and causing current to flow through the thermostat 33 and its heating coil 35, part of the current also flowing, perhaps, through the rheostat 36. The thermostat immediately begins to heat and tends to bend away from the contact 34, finally, provided the overload continues and the switch (or switches) 31 remains open sufficiently long, breaking the circuit of the no-voltage magnet, 30, thus deënergizing said magnet and allowing the spring 22 to move the controller forward from the running to the off position. If the overload ceases before the thermostat leaves the contact 34, the heating circuit of the thermostat is deënergized and the thermostat cools again without having caused an interruption of the motor circuit. The heating circuit of the thermostat 33, may carry only the current for the no-voltage magnet 30, as shown in Fig. 1, in which case the time interval is independent of the extent of the overload on the motor M; or it may carry a current proportional to the main motor current, (and also, if desired, the no-voltage magnet current), as shown in Fig. 3, in which case the time interval between the beginning of the overload and the movement of the controller from the running to off position varies inversely as the overload on the motor.

Various changes may be made in the particular arrangement here shown and described, and all such which do not depart from the spirit and scope of my invention I aim to cover in the following claims.

What I claim as new is:

1. In a controller, a controller drum normally movable always in the same direction and having off, starting, and running positions, said drum being biased backward to off position when it is in a starting position and forward to off position when it is in running position, a magnet on the terminals of which is impressed a voltage varying substantially in proportion to the voltage of the supply circuit, means operative while such magnet is energized for preventing the aforesaid bias from being effective when the controller is in running position, a thermostatic switch in the circuit of said magnet, said thermostatic switch being normally closed and arranged to open upon being heated, a switch controlling the heating of said thermostat, and means for operating said last mentioned switch upon an overload.

2. In a controller, a controller drum normally movable always in the same direction and having off, starting, and running positions, said drum being biased backward to off position when it is in starting position and forward to off position when it is in running position, a magnet on the terminals of which is impressed a voltage varying substantially in proportion to the voltage of the supply circuit, means operative while such magnet is energized for preventing the aforesaid bias from being effective when the controller is in running position, and means for deënergizing said magnet upon the continuance of an overload for a predetermined time.

3. In a controller, a controller drum normally movable always in the same direction and having off, starting, and running positions, said drum being biased backward to off position when it is in starting position and forward to off position when it is in running position, a magnet on the terminals of which is impressed a voltage varying substantially in proportion to the voltage of the supply circuit, means operative while such magnet is energized for preventing the aforesaid bias from being effective when the controller is in running position, a thermal time limit device arranged when heated to cause the deënergization of said magnet, and means for heating said thermal device during the continuance of an overload.

4. In a controller, a movable member which when in running position is biased to off position, a no-voltage magnet for normally preventing said bias from being effective, a thermostat having a heating circuit and controlling said no-voltage magnet, and means for energizing the heating circuit of said thermostat upon an overload.

5. In a controller, a movable member which when in running position is biased to off position, a no-voltage magnet for preventing such bias from being effective, a thermal device controlling said no-voltage magnet, and means for heating said thermal device only during the continuance of an overload.

6. In a controller, a movable member which when in running position is biased to off position, a magnet which when energized prevents movement of said member in response to such bias, a thermal device which when heated causes the deënergization of said magnet, and means for causing heating of said thermal device during the continuance of predetermined abnormal conditions.

7. In a controller, a movable member which when in running position is biased to off position, a magnet which when energized prevents such bias from being effective, a thermal device having a heating circuit and arranged in series with said magnet to break the magnet circuit upon being heated, and means for energizing the heating circuit of said thermal device upon an overload.

8. In a controller, a movable member which when in running position is biased to off position, a magnet which when energized prevents such bias from being effective, a thermal device having a heating circuit and arranged in series with said magnet to break the magnet circuit upon being heated, a switch in shunt to said heating circuit, and means for opening said switch upon an overload.

9. In a controller, a movable member which when in running position is biased to off position, a magnet which when energized prevents such bias from being effective, a time element device connected in the circuit of said magnet and arranged to open said circuit after having been operated for a predetermined time, and means for causing the operation of said time element device during the continuance of predetermined conditions.

10. In a controller, a movable member which when in running position is biased to off position, a magnet which when energized prevents movement of said movable member in response to such bias, a time element device which when operated for a sufficient time causes the deënergization of such magnet, and means for causing the operation of said time element device during the continuance of an overload.

11. In a controller, a movable member which when in running position is biased to off position, a no-voltage magnet which when energized prevents such bias from being effective, a time element device which when operated causes the deënergization of said no-voltage magnet, and means responsive to an overload for causing the operation of said time element device during the continuance of such overload.

12. In a circuit-controlling device, fixed and movable members, said movable member having open and closed positions and when in a closed position being biased to an open position, a no-voltage magnet for preventing such bias from being effective, a thermal device controlling said no-voltage magnet and arranged when heated to cause the deënergization thereof, and means for causing the heating of said thermal device only during the continuance of an overload.

13. In a circuit-controlling device, fixed and movable members, means tending to move the movable member from a closed to an open position, a no-voltage magnet for preventing such movement, a thermostat and a switch in shunt to each other and in series with said no-voltage magnet, and means for opening said switch upon an overload.

14. In a circuit-controlling device, fixed and movable members, means tending to move the movable member from a closed to an open position, a magnet which when energized holds said movable member in closed position, a thermal device controlling said magnet, and means for causing the heating of said thermal device only during the continuance of predetermined abnormal conditions.

15. In combination, a circuit-controlling device having open and closed positions and when in a closed position being biased to open position, a magnet for preventing movement of the controlling device in response to such bias, a thermostatic device in the circuit of said magnet and arranged when heated by the passage of current to break such circuit, a short-circuit around said thermostat, and means for opening said short-circuit upon the occurrence of predetermined abnormal conditions.

16. In combination, a circuit-controlling device having open and closed positions and when in a closed position being biased to open position, a magnet for preventing movement of the controlling device in response to such bias, a thermostatic device in the circuit of said magnet and arranged when heated by the passage of current to break such circuit, a short-circuit around said thermostat, and means for opening said short-circuit upon an overload.

17. In combination, a circuit-controlling device which when in a closed position is biased to an open position, a magnet which when energized prevents it from moving in response to such bias, a thermostat arranged when heated by the passage of current to cause the deënergization of said magnet, a switch normally short-circuiting said thermostat, and means responsive to predetermined conditions for opening said switch.

18. In combination, a circuit-controlling device which when in a closed position is biased to an open position, a no-voltage magnet which when energized prevents it from moving in response to such bias, a thermostat arranged when heated by the passage of current to cause the deënergization of said magnet, a switch normally short-circuiting said thermostat, and means responsive to an overload for opening said switch.

19. In combination, a circuit-controlling device which when in a closed position is biased to an open position, a magnet which when energized prevents it from moving in response to such bias, a time element device which when operated for a sufficient time causes the deënergization of such magnet, and means for causing the operation of said time element device during the continuance of predetermined conditions.

20. In combination, a circuit-controlling device which when in a closed position is biased to an open position, a no-voltage magnet which when energized prevents it from moving in response to such bias, a time element device arranged when operated for a certain time to cause the deënergization of such no-voltage magnet, and means responsive to an overload for causing the operation of said time element device during the continuance of such overload.

21. In combination, a circuit-controlling device which when in a closed position is biased to an open position, a magnet which when energized prevents such bias from being effective, a time element device which when operated for a certain time interrupts the circuit of said magnet, and means for causing the operation of said time element device only during the continuance of predetermined abnormal conditions.

22. In combination, a circuit-controlling device which when in a closed position is biased to an open position, a no-voltage magnet which when energized prevents such bias from being effective, a time element device which when operated for a certain time breaks the circuit of said no-voltage magnet, and overload-responsive means for causing the operation of said time element device only during the continuance of an overload.

23. In a controller, a movable member having off, starting, and running positions, a magnet controlling the movement of such member from running position to off position, a thermal device controlling said magnet, and means for causing the heating of said thermal device only during the continuance of predetermined abnormal conditions.

24. In a controller, a movable member having off, starting, and running positions, means including a thermal device for controlling the movement of said member from running position to off position, and means for causing the heating of said thermal device only during the continuance of predetermined abnormal conditions.

25. In a controller, a movable member, a magnet controlling the movement of said member from running position to off position, a thermal device having a heating circuit and controlling said magnet, a switch in shunt to said heating circuit, and means independent of the current through said switch for opening said switch upon the occurrence of predetermined abnormal conditions.

26. In a controller, a movable member, means including a thermal device for controlling the movement of said member from running position to off position, said thermal device having a heating circuit, a switch in shunt to said heating circuit, and means independent of the current through said switch for opening said switch upon an overload.

27. In a controller, a movable member, a magnet which controls the movement of said member from running position to off position, a thermostat controlling the circuit of said magnet, a switch in shunt to said thermostat, and means independent of the current through said switch for opening said switch upon an overload.

28. In a controller, a movable member, means including a thermostat for controlling the movement of said member from running position to off position, a switch in shunt to said thermostat, and means independent of the current through said switch for opening said switch upon the occurrence of predetermined abnormal conditions.

29. In a circuit-controlling device, fixed and movable members, a magnet controlling the opening movement of said movable member, a thermostat and a switch in shunt to each other and controlling said magnet, and means independent of the current through said switch for opening said switch upon the occurrence of predetermined abnormal conditions.

30. In a circuit-controlling device, fixed and movable members, means including a thermal device for controlling the opening movement of said movable member, said thermal device having a heating circuit, a switch in shunt to said heating circuit, and means independent of the current through said switch for opening said switch upon an overload.

31. In combination, a circuit, a thermostat, a switch which is in shunt to said thermostat and is opened upon the occurrence of predetermined conditions in said circuit independently of the current through the switch, and means controlled by said thermostat for opening said circuit.

32. In combination, a controlled circuit, a thermal device having a heating circuit, a switch in shunt to said heating circuit, means independent of the current through said switch for opening said switch upon the occurrence of predetermined conditions in said circuit, and means controlled by said thermal device for opening said circuit.

Milwaukee, Wis., June 21, 1910.

In testimony whereof I affix my signature, in the presence of two witnesses.

NATHAN WILKINSON.

Witnesses:
Geo. B. Schley,
Chas. L. Byron.